United States Patent [19]

Grimes

[11] Patent Number: 4,983,855
[45] Date of Patent: Jan. 8, 1991

[54] LIQUID LEVEL GAUGE FOR TANKS

[76] Inventor: John F. Grimes, Box 217, Lampman, Saskatchewan, Canada, S0C 1N0

[21] Appl. No.: 309,864

[22] Filed: Feb. 14, 1989

[30] Foreign Application Priority Data

Feb. 19, 1988 [GB] United Kingdom ............... 8803875
Jun. 10, 1988 [GB] United Kingdom ............... 8813808

[51] Int. Cl.⁵ ............................................. G06K 7/15
[52] U.S. Cl. ................................. 250/577; 250/231.16
[58] Field of Search ............ 250/231 SE, 237 G, 577, 250/231 P, 231 R, 570, 231.16; 340/347 P, 624; 356/395; 33/125 C, 707; 73/305, 705; 341/13

[56] References Cited

U.S. PATENT DOCUMENTS

| | | | |
|---|---|---|---|
| 4,254,334 | 3/1981 | Baud | 250/577 |
| 4,320,394 | 3/1982 | John, Jr. | 250/231 R |
| 4,342,996 | 8/1982 | Jannotta | 250/231 SE |
| 4,358,960 | 11/1982 | Porter | 73/705 |
| 4,804,944 | 2/1989 | Golladay et al. | 250/231 SE |

FOREIGN PATENT DOCUMENTS

586419 1/1983 Japan .

*Primary Examiner*—David C. Nelms
*Attorney, Agent, or Firm*—Murray E. Thrift; Stanley G. Ade; Adrian D. Battison

[57] ABSTRACT

A liquid level gauge for tanks includes a float located in the tank to follow the level of liquid in the tank. A cable extends from the float to the top of the tank and over a pulley to the outside of the tank, where it is attached to a weight for maintaining tension in the cable. The pulley is attached to a signal generator that generates two electrical signals. These are lead from the signal generator to a counter which decodes the two signals and produces a running count representing the height of liquid in the tank. The preferred embodiment of the invention uses a segmented optical disk and two phototransistors for producing two out of phase pulsed signals. The number of pulses represents the magnitude of float movements, while the sequence of the phase-shifted pulses represents the direction of float movement.

13 Claims, 2 Drawing Sheets

LIQUID LEVEL GAUGE FOR TANKS

FIELD OF THE INVENTION

The present invention relates to tank gauges and more particularly to level gauges for use in large size stationary tanks such as oil holding tanks.

BACKGROUND

The present invention has particular utility in connection with those oil tanks used for storing crude oil as it is pumped from the ground. Such tanks are typically between three and four meters in diameter and six meters high and contain about 400, 500, or 1,000 barrels of oil. The conditions of use are often quite rugged. It is therefore important that any level gauge for such a tank be itself rugged and reliable.

In response to these requirements, there has been developed a level indicating system consisting of a float inside the tank connected to one end of a cable that runs up to the top of the tank, over a pulley and down to a weight on the outside. The weight conventionally runs in a vertical track on the side of the tank, with the position of the weight indicating the oil level in the tank. This system is not always satisfactory as the weight will often stick in the track in which it runs so that in order to determine the actual level of liquid, it is necessary for an operator to go to the tank, pull on the weight and set the system oscillating so that when the oscillations damp down, the reading is fairly reliable.

The present invention proposes an alternative system that is more reliable, eliminates the sticking of the weight in the track, and where necessary can be read from a remote location.

SUMMARY

According to one aspect of the present invention there is provided a liquid level gauge for tanks comprising:

a float located in the tank to follow the level of liquid therein;

signal generating means responsive to the movement of the float to produce first and second signals representing the magnitude of vertical movements of the float and the direction of such movements;

counter means having two inputs operatively connected to the signal generating means for receiving the first and second signals from the signal generating means, for maintaining a running count representing the fluid level in the tank.

In the preferred embodiment of the invention a weight, float and cable arrangement is used to drive a pulley at the top of the tank. The signal generator includes a transparent disc with opaque segments around its periphery connected to the pulley shaft. Two photo transistors are spaced around the edge of the disc so that one will be activated before the other when the disc rotates in one direction and vice versa. The number of pulses from the phototransistors represent the magnitude of float movement, while the sequence in which pulses are produced by the two phototransistors indicates the direction of movement. A solid state logic circuit receives phototransistor pulses and provides two signal outputs to the counter, causing it to count up or down according to the direction and magnitude of float movements.

BRIEF DESCRIPTION OF THE DRAWINGS

In the accompanying drawings, which illustrate exemplary embodiments of the invention.

DETAILED DESCRIPTION

Figure 1:
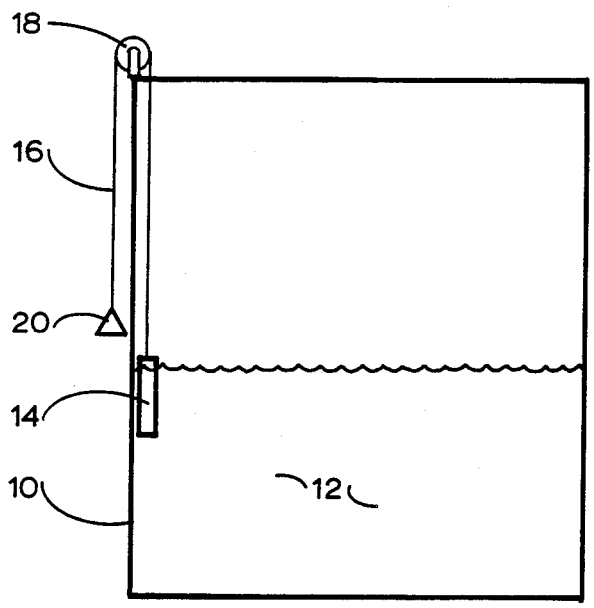
FIG. 1 is a schematic sectional elevation of an oil tank equipped with a level gauge.

Referring to the drawings, FIG. 1 illustrates an oil tank 10 that is partially filled with oil 12. A float 14 floats partially submerged in the oil 12. It is connected to one end of a cable 16 that runs over a pulley 18 mounted on the top of the tank, and down the outside of the tank to a weight 20. As the oil level in the tank 10 changes, the float will follow it, thus rotating the pulley and raising or lowering the weight.

Figure 2:
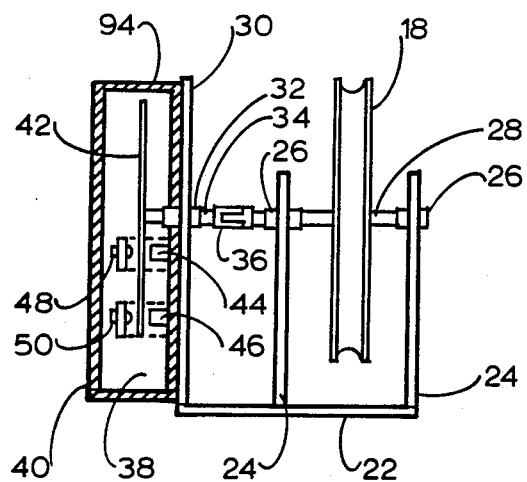
FIG. 2 is a side elevation, partly in section, of a gauge according to the present invention.

FIG. 2 illustrates the level metering system of the gauge. This is carried by a base plate 22. Two bearing supports 24 project upwardly from this base 22 and support aligned bearings 26 carrying a pulley shaft 28 for the pulley 18. The base 22 also carries a support plate 30 that carries a further bearing 32 supporting a shaft 34 connected end to end with the pulley shaft with a coupling 36.

The support plate 30 also carries a metering head 38 that is housed within a receptacle 40.

FIG. 2 illustrates the gauge metering system. The metering head 38 includes a transparent disc 42 mounted on the shaft 34 to rotate with it. The disc 42 extends over two phototransistors 44 and 46 that are spaced around the circumference of the disc. Two light emitting diodes (L.E.D.'s) 48 and 50 are aligned with the transistors 44 and 46 respectively to illuminate the transistors through the disc 42. The mounting of the diodes and the transistors is illustrated schematically in FIG. 2. In practice, a common housing carrying the transistor 44 and LED 48 and a second housing carrying the transistor 46 and LED 50 will be used with appropriate shielding to prevent the transistors from being turned on by extraneous light.

Figure 3:
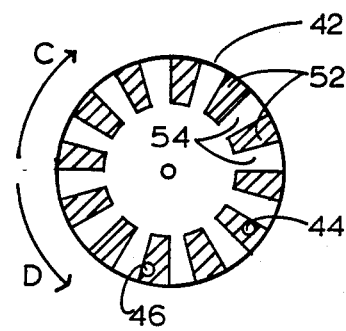
FIG. 3 is an end elevation of the metering head of FIG. 2.

As illustrated in FIG. 3, the disc 42 has an annular array of alternate opaque segments 52 and light transmitting, in this case transparent, segments 54 around its periphery. This annular peripheral area extends between the LEDs 48 and 50 and the transistors 44 and 46. As illustrated in FIG. 3, the transistors 44 and 46 are arranged so that they will be turned on at different times in response to rotation of the disc 42. Thus, when the disc 42 rotates in the direction of arrow C, the transistor 44 will be turned on first followed by transistor 46. Conversely, when the disc rotates in the direction of arrow D, the transistor 46 will be turned on first, followed by the transistor 44. As the disc rotates, the transistors will pulse on and off as the opaque segments 52 pass between the transistors and the LEDs 48 and 50 with the two pulse trains phase shifted with respect to one another, the phase shift differs according to the direction of rotation and is used as a signal indicating the direction.

Figure 4:
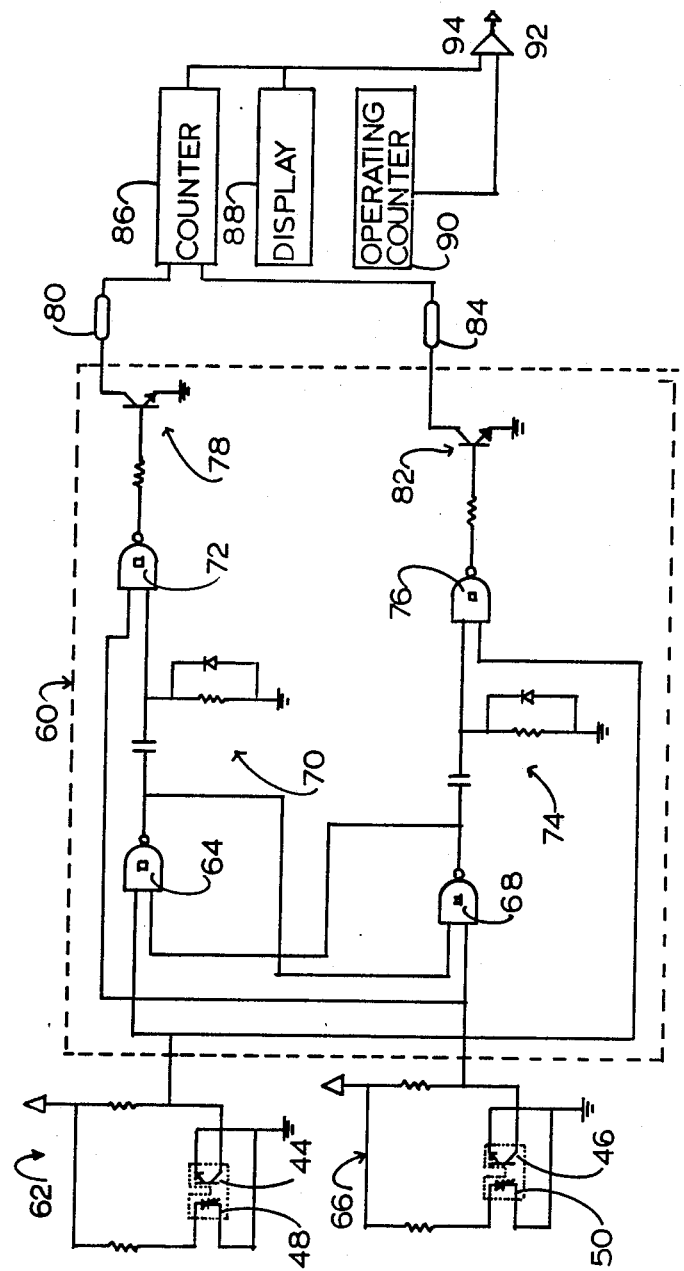
FIG. 4 is a circuit diagram of the electrical system for the gauge.

FIG. 4 illustrates a switching circuit 60 for the gauge. As illustrated, the output from a detector circuit 62 containing the transistor 44 is passed to one input of a NAND gate 64 while the output from transistor 46 is delivered from detector circuit 66 to one input of a NAND gate 68. The output of gate 64 is supplied to the second input of gate 68, while the output of gate 68 is supplied to the second input of gate 64. The output of gate 64 is also passed through a transient filter 70 to a NAND gate 72 along with the output from transistor 46. Likewise, the output of Gate 68 is passed through a transient filter 74 to NAND gate 76 with the output of transistor 44. The output of gate 72 is passed through a resistor to the base of transistor 78, which has its collector coupled to an output terminal 80. The output of gate 76 is likewise passed through a resistor to the base of transistor 82. The collector of the transistor is connected to an output terminal 84.

In order for any of the NAND gates to produce a low output, it must be supplied with two high inputs. Otherwise, the output of the gate will be high.

Considering the position of the disc 42 as illustrated in FIG. 3, the output of both phototransistors is low. The two detector circuits 62 and 66 then provide high signals to the four NAND gates. One of gates 64 and 68 will be producing a high output while the other will be a low output. Similarly, one of gates 72 and 76 will have a high output and the other a low output. This produces a high output at one of the terminals 80 and 84 and a low output at the other. As the disc 42 rotates in the direction C, the transistor 44 is turned on and the output from detector circuit 62 to the switching circuit goes low. The qates 64 and 76 will have a high output while the gates 68 and 72 will have a low output Transistor 78 is off so the output at terminal 80 will be high while transistor 82 is on and the output at 84 is low.

Further rotation of the disc in the direction of arrow C will turn on transistor 46, producing a low output from detector 66 to the circuit. The gates 64 and 76 maintain their high outputs and the gates 68 and 72 switch to a high output, turning on transistors 78 and 82 and producing low outputs at terminals 80 and 84.

Further rotation of the disc turns off transistor 44 so that the output from detector 62 to the switching circuit 60 goes high. This produces low outputs from gates 64 and 76 and a high output at terminal 84.

In the final phase of rotation in direction C, the transistor 46 is turned off, which has no effect on the condition of the circuit.

The effect of rotation in the direction of arrow C is to produce a high output at terminal 80 combined with a low output at terminal 84, followed by a low output at both terminals and then a low output at terminal 80 with a high output at terminal 84. Rotation of the disc in the opposite direction will produce a low output at terminal 80 combined with a high output at terminal 84, followed by a low output at both terminals and then a high output at terminal 80 combined with a low output at terminal 84.

The signals from the terminals 80 and 84 are used to drive a digital counter 86 which counts up at the leading edge of a pulse at terminal 84 and counts down at the trailing edge of a pulse at terminal 80. An existing high signal at terminal 80 inhibits a count from a pulse at terminal 84, while a low signal at terminal 84 inhibits counting in response to a pulse at terminal 80. One counter meeting these requirements is available from Omron Tateisi Electronics Co. of Japan as a Model H7CN Digital Counter.

The counter 86 has an output to an LED display 88 that indicates the height of oil 12 in the tank 10. An operating counter 90 is a manually set counter that produces an output representing the maximum level of oil for the tank 10. The output of the operating counter and the output of counter 86 are compared in a comparator circuit 92 which provides an output signal 94. When that signal indicates that the count on counter 86 has reached the same count as that preset on the operating counter 90, the resultant signal may be used to trigger a pump switch or valve, shutting off flow into the tank 10. The Omron Model H7CN counter mentioned above incorporates an operating counter and LED display.

The electrical connections between the terminals 80 and 84 and the digital counter 86 may be as long as necessary, so that the counter 86, display 88 and operating counter 90 may be at any location remote from the tank 10.

The number of segments 52 and their widths control the sensitivity of the output from the gauge. A sensitivity of 1 cm in liquid level has been found satisfactory for most purposes. In some cases however, it will be preferred to use a sensitivity of 1 mm so that the gauge can be used for leak detection.

While one specific embodiment of the invention has been described in the foregoing, it is to be understood that other forms are possible within the scope of the invention. For example, signal generators other than the photo electric arrangement can be used either to produce a pulsed signal or, where desired, an analog signal. The pulsed signal is preferred as it can be fed directly into a digital counter. One alternative arrangement uses two switches, one generating pulses in response to rotation of the pulley 18 and another responsive to the direction of rotation to control addition or subtraction of the pulses.

The embodiment of the invention described in the foregoing employs the known float, weight and pulley system for directly detecting the level of liquid 12 in tank 10 as this is a proven system. Other input arrangements may be employed however, so long as the physical movement of the float 14 may be translated into an appropriate signal.

I claim:

1. A liquid level gauge for tanks comprising:
    cable means having one end in said tank and an opposite end outside the tank;
    rotor means outside the tank about which the cable means is engaged;
    mounting means mounting the rotor means for free rotation;
    a float located in the tank to follow the level of liquid therein, the float being secured to the one end of the cable means;
    balance means connected to the opposite end of the cable means for applying a tension on the cable means;
    signal generating means comprising a disc connected to the rotor means for rotation therewith and switch means comprising two switches operatively associated with the disc for generating respective first and second signals, which comprise respective sets of signal pulses, in response to rotation of the disc, the first and second signals representing the magnitude of vertical movements of the float and the direction of such movements; and
    counter means having two inputs operatively connected to the signal generating means for receiving the first and second signals from the signal generating means and for maintaining a running count representing the liquid level in the tank.

2. A gauge according to claim 1 wherein the disc comprises an annular array of opaque and light transmitting areas and the switch means comprise light sensitive switches confronting the annular array and operating in response to light passing through the light transmitting areas of the array to generate signal pulses.

3. A gauge according to claim 2 wherein the switch means comprise two light sensitive switches at spaced positions along the array.

4. A gauge according to claim 3 wherein the light responsive switches are spaced along the array to be switched on at different times in response to rotation of the disc.

5. A gauge according to claim 4 wherein the signal generating means include signal processing means responsive to the sequential operation of the light responsive switches to generate the first and second signals.

6. A gauge according to claim 5 wherein the signal processing means include means for producing pulsed first and second signals.

7. A gauge according to claim 1 wherein the rotor means comprise a pulley.

8. A gauge according to claim 7 including means mounting the disc and pulley on the tank, adjacent the top thereof.

9. A gauge according to claim 8 wherein the cable means comprise a cable secured to the float and extending over the pulley.

10. A gauge according to claim 9 wherein the balance means comprise a weight secured to the cable on an opposite side of the pulley from the float.

11. A gauge according to claim 9 wherein the signal generating means comprise means for generating two series of signal pulses, the number of pulses in each series representing the magnitude of vertical movement of the float, the pulses of the two series being out of phase in a first sense in response to upward movement of the float and out of phase in the opposite sense in response to downward movement of the float.

12. A gauge according to claim 11 wherein the signal generating means comprise two spaced apart photo detecting means, means defining an array of alternating opaque and light transmitting areas, and means for moving the array past the photo detecting means in response to vertical movements of the float, the photo detecting means being operative to produce the two series of pulses.

13. A gauge according to claim 1 wherein the first and second signals are phase-shifted with respect to one another, with the phase-shift differing according to the direction of motion of the float.

* * * * *